United States Patent [19]

Grenfell

[11] Patent Number: 5,369,983

[45] Date of Patent: Dec. 6, 1994

[54] DETECTION MEDIUM AND METHOD FOR USE IN HERMETIC SEAL TESTING

[75] Inventor: Mark W. Grenfell, Woodbury, Minn.

[73] Assignee: Minnesota Mining and Manufacturing Company, St. Paul, Minn.

[21] Appl. No.: 870,408

[22] Filed: Apr. 17, 1992

[51] Int. Cl.$^5$ .............................................. G01M 3/00
[52] U.S. Cl. ................................. 73/40.7; 73/45.5; 73/49.3; 73/52
[58] Field of Search .................. 73/40.7, 45.5, 49.3, 73/52; 568/604; 570/134, 126

[56] References Cited

U.S. PATENT DOCUMENTS

| | | | |
|---|---|---|---|
| 2,500,388 | 3/1950 | Simons | 568/683 |
| 2,519,983 | 8/1950 | Simons | 204/59 R |
| 2,594,272 | 4/1952 | Kauck et al. | 549/428 |
| 2,616,927 | 11/1952 | Kauck et al. | 564/462 |
| 3,214,478 | 10/1965 | Millian | 568/615 |
| 3,242,218 | 3/1966 | Miller | 568/615 |
| 3,250,807 | 5/1966 | Fritz et al. | 562/583 |
| 3,250,808 | 5/1966 | Moore et al. | 562/586 |
| 3,274,239 | 9/1966 | Selman | 562/503 |
| 3,342,875 | 9/1967 | Selman et al. | 568/615 |
| 3,548,636 | 12/1970 | Litant | 73/40.7 |
| 3,572,096 | 3/1971 | Meyer | 73/40.7 |
| 3,675,468 | 7/1972 | Caccamesi et al. | 73/40.7 |
| 3,738,158 | 6/1973 | Farrell et al. | 73/40.7 |
| 4,282,744 | 8/1981 | Dick | 73/49.3 |
| 4,328,700 | 5/1982 | Fries | 73/40.7 |
| 4,460,664 | 7/1984 | Jurva et al. | 429/181 |
| 4,565,093 | 1/1986 | Jurva et al. | 73/40.7 |
| 4,736,621 | 4/1988 | Slinn et al. | 73/45.5 |
| 4,788,339 | 11/1988 | Moore et al. | 564/457 |
| 4,896,529 | 1/1990 | Tonelli et al. | 73/40.7 |
| 4,909,806 | 3/1990 | Garbe | 8/64.7 |
| 4,918,975 | 4/1990 | Voss | 73/40.7 |
| 4,920,785 | 5/1990 | Etess | 73/40.7 |
| 4,955,726 | 10/1990 | Bargigia et al. | 374/57 |
| 5,001,343 | 3/1991 | Gnade et al. | 250/303 |
| 5,131,263 | 7/1992 | Handke et al. | 73/40.7 |
| 5,167,140 | 12/1992 | Cooper et al. | 73/40.7 |

FOREIGN PATENT DOCUMENTS

| | | | |
|---|---|---|---|
| 8900301 | 9/1990 | Netherlands | 73/40.7 |
| 1213406 | 11/1970 | United Kingdom | |
| 1647318 | 5/1991 | U.S.S.R. | 73/40.7 |

OTHER PUBLICATIONS

Elektronik. vol. 26, No. 4, Apr. 1977, Munchen de pp. 93-94; W. Sander 'Bauelementeprufung mit Perfluorierten Flussigkeiten'.

Patent Abstracts of Japan, vol. 6, No. 166 (P-138)(1044) 31 Aug. 1982 & JP-A-57 082 738 (Toshiba Corp.) 24 May 1982.

K. H. Nelson, *Gas Chromatographic Detection of Leaks in Microelectronic Packages*, Microelectronics and Reli- (List continued on next page.)

*Primary Examiner*—W. Gary Jones
*Assistant Examiner*—Laura E. Collins
*Attorney, Agent, or Firm*—Gary L. Griswold; Walter N. Kirn; Eloise J. Maki

[57] ABSTRACT

A detection medium and method for use in detecting gross and fine leaks in a hermetically sealed package. In a preferred embodiment, the detection medium includes a detectable perfluorinated gas dissolved in a detectable perfluorinated liquid. The package is placed in a bombing chamber and then exposed to the detection medium under pressure introduce the detectable liquid and dissolved, detectable gas into the package through any gross leak openings and to introduce the detectable gas and some detectable liquid vapor into the package through any fine leak openings. The package is then removed from the detection medium and air dried to evaporate any detection medium attached to an exterior surface of the package. The package is placed in a test chamber which collects detectable gas and vapor of the detectable liquid escaping through the gross and fine leak openings. A measurement instrument detects whether a component of the detection medium has escaped from the sealed package as an indication of a leak.

22 Claims, 3 Drawing Sheets

OTHER PUBLICATIONS ability, 8, pp. 313–318, 1969, Perrgamon Press.

Lyle E. Bergquist, *A Helium Leak Detector for Small Components*, Physics Reliability Symposium, (1985).

H. A. Schafft, *Semiconductor Measurement Technology: ARPA/NBS Workshop II, Hemeticity Testing for Integrated Circuits*, Nat. Bur. Stand. (U.S.), Spec. Publ. 400-9, (Dec. 1974).

S. Ruthberg, *Hermetic Seal Testing of Large Hybrid Packages*, International Journal for Hybrid Microelectronics, vol. 5, No. 2, Nov. 1982, Int. Microelectronic Symposium, Reno, Nev., USA, Nov. 15–17, (1982).

A. DerMarderosian, *Permissible Leak Rates and Moisture Ingress*, International Reliability Phyiscs Symposium, Caesars Palace, Las Vegas, Nev. (1984).

3M Company Technical Bulletin #98-0211-5347-7 (101.5) NPI, *Fluorinert TM Liquids*, (1990).

Kirk–Othmer, *Encyclopedia of Chemical Technology*, vol. 10, pp. 874–881, (John Wiley & Sons 3d Ed. 1980).

Military Standard 883C, Method 1014.9 (Mar. 1989).

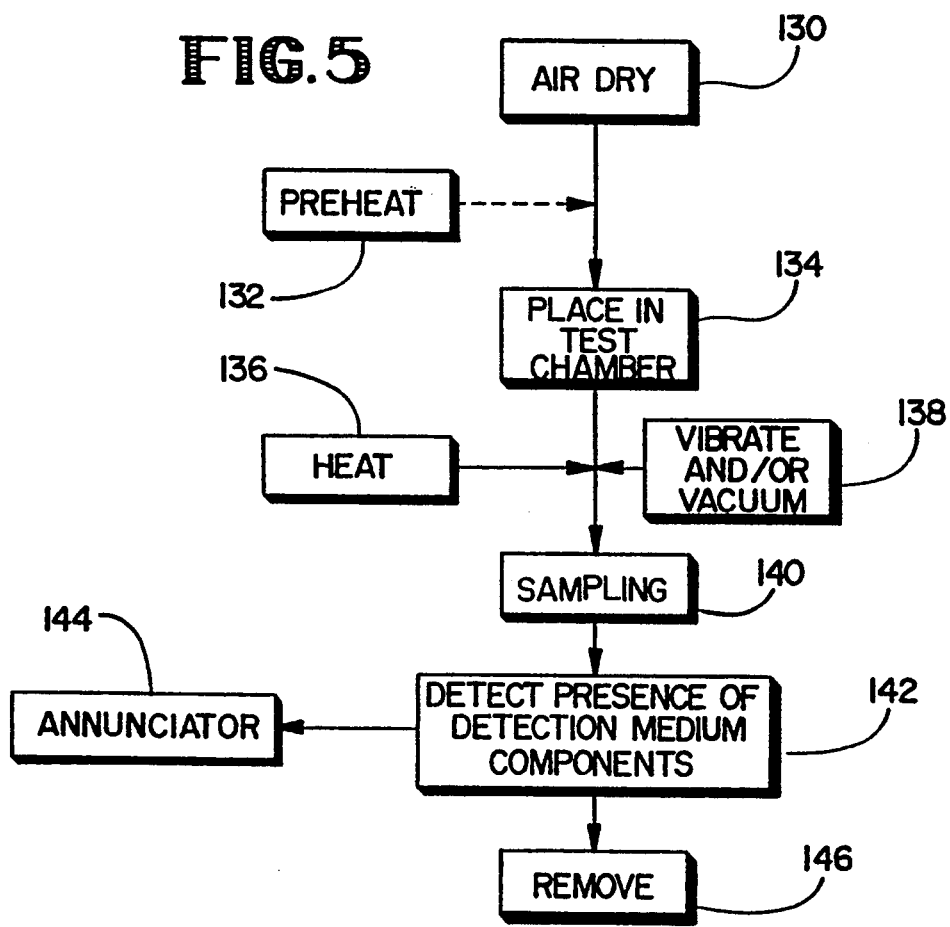

DETECTION MEDIUM AND METHOD FOR USE IN HERMETIC SEAL TESTING

BACKGROUND OF THE INVENTION

The present invention relates to a detection medium used for simultaneously detecting gross and fine leaks in hermetic seals.

Hermetic seals are used in a wide variety of applications. For example, in the electronics industry, solid state devices must be protected from the ambient atmosphere to guarantee their continued operation. Ambient air containing moisture can accumulate in the device causing corrosion and failure. High reliability devices are often protected by enclosing the devices in ceramic packages which are hermetically sealed. However, it is not possible to obtain a zero leak rate for every package. The packages must be tested to determine if the leak rate is below a set standard for a given internal sealed volume.

The most common standard employed for ceramic packages is provided in Military Specification ("Mil. Spec.") 883D (previously 883C), Method 1014.9. Standard leak rates are based on the leak rate of dry air at 25° C. flowing through a leak path with a high pressure side of the leak at 1 atmosphere (760 torr absolute) and a low pressure side of the leak at less than 1 torr absolute.

Hermetic seal testing of ceramic packaging has traditionally been performed in two steps. The first step is designed to expose fine leak rates of $1 \times 10^{-5}$ atm-cc/sec or less of dry air. A detectable gas is used to penetrate the fine leak openings. The second step is designed to expose gross leak rates between $1 \times 10^0$ atm-cc/sec and $1 \times 10^{-5}$ atm-cc/sec of dry air. A liquid is used to penetrate the gross leak openings. The fine leak test fails to detect gross leak openings because the gas diffuses too rapidly from the package to be detected. Historically, the fine leak test has been performed before the gross leak test because of a common belief that the liquid may block or even close a fine leak, thereby preventing its detection. Also, it is specified in Mil. Spec. 883D that fine leak testing should occur first.

Fine leak testing is typically performed using a tracer gas of either helium or krypton-85. Helium leak detection is the most common way to measure fine leaks. The measurement consists of placing a package to be tested into pressurized helium to force helium through the leaks and into a cavity in the package. The pressure level and duration of the pressurization step are defined in Mil. Spec. 883D, Method 1014.9. The package is removed from this environment and then tested for the presence of helium. Any helium escaping from the package cavity is detected with a helium mass-spectrometer leak detector. The helium leak test is very sensitive and is reported to detect leaks down to $1 \times 10^{-12}$ atm-cc/sec.

The krypton leak test is another method of detecting fine leaks. The package to be tested is placed into an atmosphere of radioactive tracer gas containing a mixture of krypton-85 and dry nitrogen. The atmosphere is pressurized according to Mil. Spec. 883D, Method 1014.9. If a leak exists, the radioactive tracer gas will be forced through the leak opening and into the package. Faulty seals can be detected by measuring the radioactive decay from within the package cavity with a scintillation crystal-equipped counting station after the package is removed from the radioactive environment. Background radiation is compared to the measured value to determine the magnitude of the leak.

Gross leak testing involves using either fluorocarbon liquids or a dye penetrant, as provided in Mil. Spec. 883D. The dye penetrant leak measurement involves detecting fluorescent dyes which have entered the package. The fluorocarbon liquid tests include a bubble test, a weight gain test, and a negative ion detector (NID) test. These tests are non-destructive.

The bubble test uses fluorocarbon detector liquids such as FLUORINERT TM FC-72 TM and FC-84 TM, which are manufactured by 3M, or PP-1 TM which is manufactured by the Imperial Smelting Corporation. The package to be tested is placed in a "bombing chamber." The detector liquid is "bombed" into the leaky package under a pressure of up to 90 psia (0.62 MPa) for up to 12.5 hours. After bombing, the packages are removed and dried.

The packages are then placed into a bubble tank for leak detection. The bubble tank contains a fluorocarbon indicator liquid, such as FLUORINERT TM FC-40 TM and FC-43 TM, which are manufactured by 3M, or PP-7 TM and PP-9 TM which are manufactured by the Imperial Smelting Corporation. The indicator liquid is heated to about 125° C.±5° C. The packages are immersed into the indicator liquid to a minimum depth of about two inches. If there is a leak in the package, the internal pressure within the package causes bubbles to form. The formation and size of the bubbles are monitored against a lighted, flat black background. If no bubbles form within a 30 second period, the package is considered to have no gross leaks.

The gross leak bubble test is reported to suffer from operator subjectivity and blocking of leaks by particulate. The bubble test does, however, provide a low cost and relatively fast test which is currently in wide use in production.

The weight gain test is another gross leak test which is commonly used. The weight gain test is described in Mil. Spec. 883D, Method 1014.9, Test Condition E. The weight gain test detects a leak by measuring the change in weight of a package after fluorocarbon liquid has been forced into the package through the leak. Packages to be tested are cleaned, dried and weighed. The packages are then grouped into "cells" depending upon their internal volume. Packages with an internal volume of less than 0.01 cc are put into cells of 0.5 milligram increments and packages with an internal volume greater than or equal to 0.01 cc are put into cells in 1 milligram increments.

The packages are placed under a 5 torr vacuum for one hour. A fluorocarbon liquid, such as FC-72 TM manufactured by 3M or another equivalent liquid, is admitted into the bombing chamber to cover the packages without breaking the vacuum. The packages are pressurized, for example, to 75 psia (0.52 MPa) for two hours. For sensitive parts, a lower pressure may be used with a longer bombing cycle. After bombing, the parts are air dried for approximately two minutes.

The packages are weighed individually and categorized. A package is rejected as a leaker if it gains 1.0 milligrams or more. When the packages are categorized, any package which shifts by more than one cell shall be considered a reject. If a package loses weight, it may be retested after baking for eight hours at 125° C. The weight gain test is more accurate and less operator subjective than the bubble test. However, the weight gain test is considered to be labor intensive and expensive to complete because of the sensitive balances required.

The "NID" test is described in Etess U.S. Pat. No. 4,920,785. The NID test was developed by Web Technology as an attempt to automate the weight gain test. The amount of fluorocarbon material evolving from the package after the bombing step is measured by measuring the infrared absorption of the atmosphere from the test chamber. The measured amount is proportional to the gross leak size.

Etess suggests other measurement instruments can be used with the NID test procedure. These instruments include an ultraviolet spectrometer, a thermal conductivity detector, a photoionization detector and an electron capture detector. However, the detector system manufactured by Web Technology employs an infrared absorption detector. It is believed that this system is currently not sensitive enough to detect fine leaks.

Performing separate gross and fine leak tests for each package is very time consuming and significantly adds to the cost of producing a product.

SUMMARY OF THE INVENTION

The present invention provides a detection medium and method for use which simultaneously detects gross and fine leaks in hermetic seals, such as in hermetically sealed packages. The detection medium comprises a detectable gas dissolved in a detectable liquid.

The detectable liquid passes through any gross leak openings in the hermetic seal and carries with it the dissolved, detectable gas. The detectable gas also passes through any fine leak openings in the seal by degassing from the detectable liquid. An amount of detectable liquid vapor can also pass through the fine leak openings with the detectable gas.

The detectable gas and detectable liquid vapor must be discernable from background levels of matter encountered during the test. Preferably, the detectable gas and liquid vapor are discernable in amount and type from atmospheric gases. Because detectable liquid vapor can also pass through the fine leak openings, the detectable gas and liquid are preferably chosen so that a single measurement instrument can determine the presence of either the detectable gas or the detectable liquid vapor.

Hermetically sealed packages having a sealed, internal cavity are tested by exposing the package to the detection medium. The package is then removed from the detection medium. A measurement instrument detects whether a component of the detection medium has entered the sealed package as an indication of a leak.

In one embodiment, the sealed package is exposed to the detection medium in a "bombing chamber" under pressure. Components of the detection medium enter the cavity through any gross or fine leak openings. The package is then removed from the bombing chamber and air dried to evaporate any detection medium remaining on the surface of the package.

After the package has dried, it is placed in a test chamber which collects any detectable gas or detectable liquid vapor escaping from the cavity through the fine and gross leak seal openings. The measurement instrument detects whether the gas, liquid vapor, or both escape from the sealed package as an indication of a leak. Several types of measurement instruments can be used with the present invention, including an electron capture detector and a mass spectrometer.

The presence of either the detectable liquid vapor or detectable gas in the test chamber is an indication of a leak. The measurement instrument can be calibrated to detect only detectable gas as an indication of either a gross or fine leak. However, preferably, the measurement instrument will be selected and calibrated to detect both detectable gas and detectable liquid vapor. It is believed that gross leaks are detectable with the present invention because the detectable liquid holds the detectable gas in the cavity by acting as a "reservoir" for the detectable gas, maintaining an amount of detectable gas high enough to be measured during the detection step.

The relative amount of detectable gas or liquid vapor measured during the detection step is representative of the leak size. A threshold amount (or concentration) of detectable gas or liquid vapor can be empirically selected to (i) reject packages having leaks greater than a specified size and/or (ii) compensate for background amounts of detectable gas or liquid vapor measured due to residual detection medium present on the surface of the package after the drying step or amounts of detectable gas or liquid vapor present in the atmosphere.

The present invention provides a detection medium and method for use which combines gross and fine leak detection into a single test. The test detects gross and fine leak rates ranging from about $1 \times 10^0$ atm-cc/sec to about $1 \times 10^{-9}$ atm-cc/sec. The test significantly reduces the time and effort required to test hermetic seals in a wide variety of products.

BRIEF DESCRIPTION OF THE DRAWINGS

FIG. 5 is a flow chart which illustrates the steps performed at the detection station shown in FIG. 4.

DETAILED DESCRIPTION OF THE PREFERRED EMBODIMENTS

The present invention provides a detection medium and a method for use for detecting gross and fine leaks in hermetic seals. The detection medium is capable of simultaneously detecting gross and fine leaks in a single test. The detection medium comprises, and preferably consists essentially of, a detectable gas dissolved in a detectable liquid. The detection medium can be used to test hermetic seals in a wide variety of applications, such as hermetically sealed packages or sealed barriers. An example of a single test for detecting gross and fine leaks in hermetically sealed packages is described below.

In the electronics industry, microelectronic and semiconductor devices may be hermetically sealed in metal cans or in ceramic dual-in-line-packages (DIPS). Each package is then tested for gross and fine leaks by exposing the package to the detection medium under pressure within a "bombing chamber." Components of the detection medium enter the package through any gross and fine leak openings in the seal.

Figure 1:
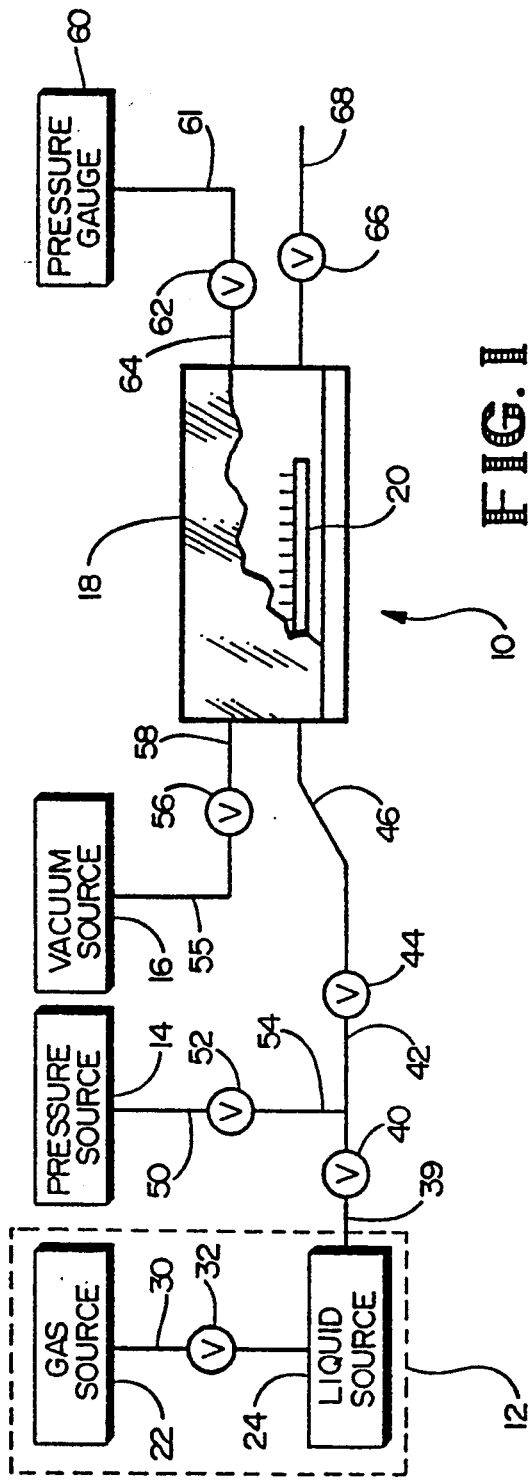
FIG. 1 is a block diagram of a pressure bombing station, in accordance with the present invention.

FIG. 1 illustrates a bombing station 10 in accordance with the present invention. Bombing station 10 includes a detection medium source 12, a pressure source 14, a vacuum source 16 and a bombing chamber 18. Portions of bombing chamber 18 are broken away in FIG. 1 to show a hermetically sealed package 20 positioned in chamber 18 for testing. Package 20 is a ceramic dual-in-line-package positioned with its pins facing upward in a "dead bug" position.

Detection medium source 12 supplies the detection medium. The detection medium components can be supplied either separately or premixed. In the embodiment shown in FIG. 1, the detectable gas and the detectable liquid are supplied separately in a gas source 22 and a liquid source 24, respectively. Gas and liquid sources 22 and 24 are connected together by a line 30 and a valve 32. Valve 32 is opened to sparge the detectable gas in the detectable liquid within liquid source 24. The detectable gas is preferably dissolved in the detectable liquid to saturation. Valve 32 may be periodically opened to maintain saturation within liquid source 24.

In an alternative embodiment, the detection medium is supplied in container 24 with the detectable gas pre-dissolved in the detectable liquid. In this embodiment, it may be desirable to keep the gas/liquid solution under pressure with gas source 22 to maintain a high concentration of the detectable gas in the detectable liquid.

Detection medium source 12 is connected to bombing chamber 18 through a line 39, a valve 40, a line 42, a valve 44 and a line 46. Line 39 is connected between detection medium source 12 and valve 40. Valve 40 is connected between line 39 and line 42. Valve 44 is connected between line 42 and line 46. Line 46 is connected to bombing chamber 18.

Pressure source 14 is connected to line 42 through a line 50, a valve 52 and a line 54. Line 50 is connected between pressure source 14 and valve 52. Line 54 is connected between valve 52 and line 42. Valve 52 controls pressurization of bombing chamber 18 from pressure source 14. Pressure source 14 contains a suitable gas, such as nitrogen, for holding the detection medium under a pressure of up to 70–90 psia (0.48–0.62 MPa) in bombing chamber 18.

Vacuum source 16 is connected to bombing chamber 18 through a line 55, a valve 56 and a line 58. Line 55 is connected between vacuum source 16 and valve 56. Valve 56 is connected between vacuum pump 16 and line 58. Line 58 is connected to bombing chamber 18. Vacuum source 16 is configured for evacuating bombing chamber 18 to an internal pressure of less than 5 torr.

Bombing station 10 further includes a pressure gauge 60 which monitors the pressure within bombing chamber 18. Pressure gauge 60 is connected to bombing chamber 18 through a line 61, a valve 62 and a line 64. Line 61 is connected between pressure gauge 60 and valve 62. Line 64 is connected between valve 62 and bombing chamber 18. A valve 66 is connected to bombing chamber 18 through a line 68 for venting the chamber.

Figure 2:
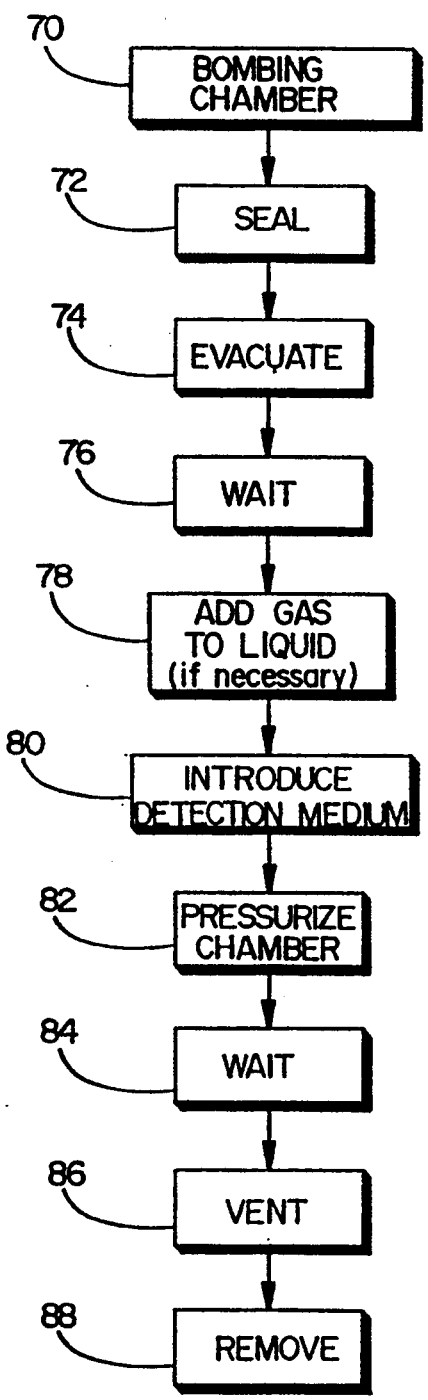
FIG. 2 is a flow chart which illustrates the steps performed at the bombing station shown in FIG. 1.

The steps performed at bombing station 10 for testing a hermetically sealed package are illustrated in a flow chart shown in FIG. 2. The flow chart includes steps 70–88. First, sealed package 20 is placed in bombing chamber 18 at step 70. Bombing chamber 18 is sealed, at step 72, by closing valves 44, 52 and 66. Valve 62 is opened so pressure gauge 60 can monitor the pressure within bombing chamber 18.

Bombing chamber 18 is then evacuated, at step 74, by opening valve 56 and operating vacuum source 16. Bombing chamber 18 is evacuated to a selected pressure and held, at step 76, for a selected time period. The pressure level and time period should be sufficient to evacuate the cavity within package 20 if a gross leak exists. In one embodiment, bombing chamber 18 is evacuated to a pressure of about 5 torr or less for about 30 minutes. Evacuating the cavity enhances the introduction of detection medium into the cavity.

If the detectable gas and the detectable liquid are supplied separately and not premixed, the gas is added to the liquid, at step 78, by opening valve 32 to introduce the gas into liquid source 24.

Next, the detection medium is introduced or "backfilled" into bombing chamber 18, at step 80, by closing valves 32 and 56 and by opening valves 40 and 44. The vacuum created in bombing chamber 18 at step 74 pulls the detection medium from detection medium source 12 into the chamber. Bombing chamber 18 is filled to a level sufficient to submerge package 20.

Bombing chamber 18 is then pressurized, at step 82, by first closing valve 40 and then opening valve 52. Bombing chamber 18 is pressurized to force the leak detection medium into openings in the package seal, if any. It is believed the detectable gas separates from the detectable liquid at the fine leak openings and enters the cavity. The detectable liquid carries the dissolved, detectable gas into the cavity through the gross leak openings.

Alternatively, the detectable gas can be used to pressurize bombing chamber 18 instead of gas from pressure source 14. However, the gas in pressure source 14 may be cheaper than the detectable gas and therefore preferred for the pressurization step.

Figure 3:
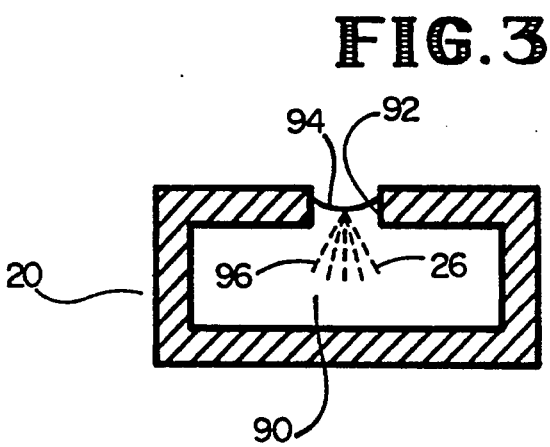
FIG. 3 is a greatly enlarged sectional view of a hermetically sealed package having a fine leak.

A theoretical illustration of the separation of the detectable gas from the detectable liquid is shown in greater detail in FIG. 3. FIG. 3 is provided for illustrative purposes only and should not limit the scope of the present invention. FIG. 3 is a greatly enlarged sectional view of sealed package 20. Package 20 includes a cavity 90 and a fine leak opening 92. The detectable liquid forms a capillary meniscus (or "bubble") 94 within fine leak opening 92.

The dimensions of fine leak opening 92 preclude viscous flow of the detectable liquid into cavity 90. However, when the detection medium is pressurized in bombing chamber 18, the detectable gases 26, will seek to escape from the detectable liquid to areas of lower pressure. With a sufficient pressure differential across fine leak opening 92, the detectable gas will separate from the detectable liquid and enter cavity 90. In addition, a small amount of the detectable liquid will vaporize and enter package cavity 90 as a liquid vapor 96.

The pressure is maintained, at step 84, in bombing chamber 18 for a time period which is sufficient to allow measurable amounts of the detectable gas and the detectable liquid and/or liquid vapor to enter cavity 90 through the gross and fine leaks. In one embodiment, bombing chamber 18 is pressurized to 75 psia (0.52 MPa) for 30 minutes. The pressure may be lowered and the time period lengthened to protect more fragile packages. The particular components and amounts of the detection medium introduced into cavity 90 will depend upon several factors, including, but not limited to, the leak size, the leak geometry, the package cavity volume, the medium used and the pressurization parameters.

Bombing chamber 18 is then vented, at step 86, by opening valve 66 and closing valves 44 and 52. Package 20 is then removed from bombing chamber 18, at step 88.

The bombing steps illustrated in FIG. 2 can be modified to meet the requirements of a particular application. For example, Mil. Spec. 883D, Method 1014.9 provides test method requirements for separate gross and fine leak testing of hermetically sealed microelectronic and semiconductor devices. The requirements vary depending upon the particular medium and test used. The bombing steps can also be modified to test hermetically sealed barriers, as opposed to sealed packages.

Figure 4:
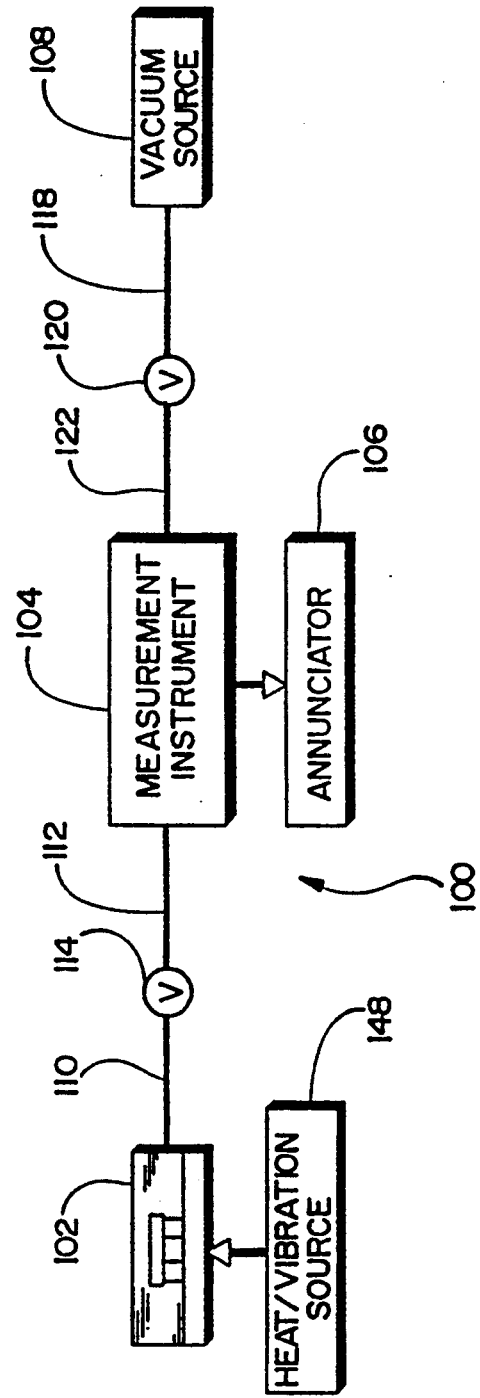
FIG. 4 is a block diagram of a detection station, in accordance with the present invention.

FIG. 4 is a block diagram of a detection station 100, in accordance with the present invention. Detection station 100 includes a test chamber 102, a measurement instrument 104, an annunciator 106 and a vacuum source 108. Test chamber 102 is connected to measurement instrument 104 through a line 110, a valve 114 and a line 112. Vacuum source 108 is connected to the measurement instrument 104 through line 118, valve 120 and line 122. Annunciator 106 is connected to measurement instrument 104.

The steps performed at detection station 100 are illustrated in a flow chart shown in FIG. 5. The flow chart includes steps 130-146. After package 20 is removed from bombing chamber 18, it is air dried, at step 130, for a time period of about 20 seconds to 20 minutes to evaporate detection medium remaining on the surface of the package. This step prevents any false detection of a leak. Optionally, evaporation of the detection medium from the surface of package 20 can be accelerated by preheating the package at step 132.

After package 20 has dried, it is placed in test chamber 102, at step 134, which collects any gas or liquid vapor escaping from cavity 90 through the fine and gross leak openings. Preferably, the package 20 is placed in the test chamber 102 in the "dead-bug" position to facilitate any heating of the package 20 during heating step 136. To accelerate the escape of the detectable gas and vapor of the detectable liquid from cavity 90, several optional steps can be performed. These steps can include heating package 20 at step 136, partially evacuating test chamber 102 at step 138 and vibrating package 20 at step 138. Vacuum source 108 is used to partially evacuate test chamber 102 to draw the detectable gas or detectable liquid vapor from cavity 90. Heat and vibration source 148 is attached to test chamber 102 to heat or vibrate package 20.

Any detectable liquid vapor and/or detectable gas escaping from package 20 is collected in test chamber 102 during sampling step 140. Detectable liquid vapor and/or detectable gas exiting package cavity 90 can be drawn into the measurement instrument 104 by opening valves 114 and 120 and applying a suction with vacuum source 108.

Whether the method of this invention includes heating step 136, vacuum and/or vibration step 138 will depend at least partially upon the selection of measurement instrument 104. The exact procedure for sampling step 140 will depend at least partially on the measurement instrument 104 selected for use in the invention. For example, if measurement instrument 104 is an infrared detector, a heating step 136 and/or a vacuum step 138, can be used advantageously. In contrast if a mass spectrometer were used as measurement instrument 104, a vacuum step 138 would necessarily be employed because such instrument typically operates at pressures of $10^{-6}$ torr.

Measurement instrument 104 detects the presence of a component of the detection medium at step 142. The amount of gas or liquid vapor detected is proportional to the leak rate of package 20. If the leak rate exceeds a specified limit for the tested package under the selected test conditions, the package is rejected. An example of leak rate reject limits for various microelectronic and semiconductor devices under various test conditions is given in Mil. Spec. 883D.

Measurement instrument 104 can be configured to distinguish between the detectable gas and the detectable liquid vapor. The levels of detectable gas and detectable liquid vapor are compared to predetermined threshold levels. The threshold levels are empirically selected to ignore detectable gas and liquid vapor levels measured from detection medium present on the exterior surface of package 20 and from the background atmosphere.

In one embodiment, measurement instrument 104 includes a gas chromatograph which distinguishes between the detectable gas and the detectable liquid vapor by first separating the components of the detection medium and measuring the amount of the gas or liquid vapor. The gas chromatograph allows an operator to distinguish between gross and fine leaks by determining the amount and the combination of components escaping from package 20. If package 20 has fine leaks, but no gross leaks, measurement instrument 104 will detect an amount of the detectable gas and possibly a small amount of detectable liquid vapor. If package 20 also has gross leaks, measurement instrument 104 will detect both detectable liquid vapor and detectable gas escaping from the package 20. The ratio of the concentrations of detectable gas to the detectable liquid vapor may also be helpful in determining the size of the leak.

In an alternative embodiment, measurement instrument 104 can be configured to simultaneously detect the presence of either the detectable gas or vapor of the detectable liquid, without distinguishing between them.

In another alternative embodiment, measurement instrument 104 is configured to detect gross and fine leaks by detecting the amount of the detectable gas alone. This test is possible with the present invention because the detectable liquid holds the dissolved, detectable gas within the package cavity at an amount high enough to be measured during detection step 142. The liquid acts as a "reservoir" for the gas within package cavity 90. Current test procedures are not effective in detecting gross leaks with solely a gas test medium because the gas diffuses through the gross leaks too rapidly to be detected.

Several measurement instruments can be used in accordance with the present invention. These instruments include an electron capture detector, a mass spectrometer, an infrared spectrometer, an ultraviolet spectrometer, a thermal conductivity detector, a photoionization detector, a flame ionization detector, a flame photometric detector, an electrolytic conductivity detector (Hall detector), an atomic emission detector, a helium ionization detector and a Redox chemiluminescence detector. The flame photometric detector, and the Redox chemiluminescence detector are good for detecting sulfur containing compounds. The electrolytic conductivity detector is good for detecting halogenated compounds.

If a radioactive detection medium is used, such as a detection medium containing a krypton-85/dry nitrogen mixture as the detectable gas, leaks in package 20 can be detected by measuring the radioactivity in the package after removing the package from the radioactive environment. A scintillation crystal-equipped counting station is used to count the radioactive decay from within the package cavity.

After the test is complete, measurement instrument 104 displays the result of the test on annunciator 106, at step 144. Annunciator 106 can include a pass/reject indicator light, a numerical display or a graphical printout, for example. Package 20 is then removed, at step 146, from test chamber 102 and replaced with another package to be tested.

The steps illustrated in FIG. 5 of detecting whether a component of the detection medium has passed through the seal can be modified to suit a particular application or can be modified to test hermetically sealed barriers, as opposed to sealed packages.

The detectable liquid should have physical and chemical properties making it highly detectable by measurement instrument 104. To be highly detectable, the liquid should be readily discernable in amount from the background concentrations of the detectable liquid vapor present in the atmosphere of the test chamber during sampling step 140. Typically, compounds which are present in the ambient atmosphere in low concentration will be readily discernable in amount from background concentrations present in the test chamber. Additionally, the detectable liquid is advantageously chosen to be one whose presence is readily measurable using known chemical analytical or physical detection techniques.

The detectable liquid should have a low surface tension to thereby allow the liquid to flow readily through leaks in the package seal. A surface tension of less than about 75 dynes per centimeter (measured at 25° C.) is satisfactory. Preferably, the liquid has a surface tension of less than about 25 dynes per centimeter. Most preferably, the liquid has a surface tension of less than about 20 dynes per centimeter.

The detectable liquid should have a liquid state under standard conditions (i.e. 760 torr and 25° C.). The detectable liquid should be stable, inert (i.e., chemically nonreactive/noncorrosive), and relatively non-polar.

Preferably, the detectable liquid is highly fluorinated, that is, it contains about 16 to 86 weight percent of carbon-bonded fluorine. Most preferably, it will contain about 60 to 86 weight percent carbon-bonded fluorine. Examples of useful classes of highly fluorinated liquids include, but are not limited to, hydrofluorocarbon liquids, chlorofluorocarbon liquids, hydrochlorofluorocarbon liquids and perfluorinated liquids. As mentioned above, the detectable liquid can contain some hydrogen or chlorine, but preferably, it is essentially completely fluorinated. The detectable liquid can be a single compound or a mixture of compounds having the above characteristics.

The highly fluorinated liquids can be straight-chain, branched, cyclic, or a combination thereof, such as alkylcycloaliphatic. They are preferably free of ethylenic unsaturation. The skeletal chain of the compounds can include catenary oxygen, hexavalent sulfur, and/or trivalent nitrogen heteroatoms bonded only to carbon atoms; provided the heteroatoms provide stable linkages between fluorocarbon groups and do not interfere with the inert character of the liquid. The liquids may also contain one or more pendant sulfur pentafluoride groups such as nonafluorobutylsulfurpentafluoride ($C_4F_9$—$SF_5$).

The detectable liquid preferably has about 6 to about 20 carbon atoms and most preferably has about 6 to 12 carbon atoms. The maximum number of carbon atoms is dictated by the desired boiling point of the detectable liquid. The detectable liquid should have a boiling point which is low enough to quickly evaporate from the surface of the package after it is removed from the bombing chamber and which is high enough to minimize production losses of the detectable liquid during the testing process. A boiling point of between about 30° C. and about 180° C. is satisfactory. Preferably, the boiling point is in the range from about 30° C. to about 150° C. and most preferably from about 65° C. to about 110° C.

Detectable liquids useful in this invention are known and readily available, usually as mixtures. U.S. Pat. Nos. 3,250,807 (Fritz et al.), 3,250,808 (Moore et al.), and 3,274,239 (Selman) disclose fluorinated liquids, made by polymerization of perfluoropropylene oxide. U.S. Pat. Nos. 3,214,478 (Harriman), 3,242,218 (Miller), and 3,342,875 (Selman et al.) disclose stabilization to provide inert fluorochemical liquids. Stabilization converts functional or active end groups to inert and groups (e.g., —$CF_2H$ or —$CF_3$) by reaction with fluorinating agents, bases (e.g. NaOH), or ultraviolet radiation.

U.S. Pat. Nos. 2,500,388 (Simons), 2,519,983 (Simons), 2,594,272 (Kauck et al.), 2,616,927 (Kauck et al.), and 4,788,339 (Moore et al.) describe the preparation of inert, highly fluorinated compounds, such as highly fluorinated hydrocarbons, ethers, aminoethers, and tertiary amines. The preparation involves electrochemical fluorination in an anhydrous HF medium.

Commercially available inert fluorochemical liquids useful in this invention include 3M's Fluorinert TM liquids and mixtures thereof. Examples of useful Fluorinert TM liquids include FC-40, FC-43, FC-70, FC-71, FC-72, FC-75, FC-77, and FC-84, which are described in 3M's 1990 bulletin #98-0211-5347-7(101.5) NPI, "Fluorinert TM Liquids." Also useful individually or as mixtures are Krytox TM K fluids, Flutec TM PP fluids, and Galden TM LS fluids. Other useful inert fluorochemical liquids include those described in Kirk-Othmer, *Encyclopedia of Chemical Technology*, Vol. 10, pp 874–881, (John Wiley & Sons 3d ed. 1980).

Useful detectable liquids include, but are not limited to:

perfluorinated alkanes including, but not limited to, perfluoropentane, perfluorohexane, perfluoroheptane, perfluorooctane, perfluorocyclohexane and perfluorodimethylcyclobutane;

perfluorinated amines including, but not limited to perfluorotriethylamine, perfluorotripropylamine and perfluorotributylamine;

perfluoroaminoethers, including but not limited to, perfluoro-n-methylmorpholine and perfluoro(diethylaminoethyl)ether;

perfluorinated ethers including, but not limited to, perfluorodipropylether, perfluorodibutylether, perfluoropropylbutylether, perfluoropolyethers containing two or more oxygen atoms, such as $CF_3$—[O—$CF(CF_3)$—$CF_2]_n$—$(CF_2$—O$)_m$—$CF_3$, and perfluoro-2-butyltetrahydrofuran;

chlorofluorocarbon liquids including, but not limited to, 1,1,2-trichloro-1,2,2-trifluoroethane (Freon-113);

hydrochlorofluorocarbon liquids including, but not limited to, 1,1-dichloro-2,2,3,3,3-pentafluoropropane (HCFC-225ca), 1,3-dichloro-1,2,2,3,3-pentafluoropropane (HCFC-225cb) and 1,1-dichloro-2,2,2-trifluoroethane (HCFC-123); and hydrofluorocarbon liquids including, but not limited to, 1,1,2,2-tetrafluorocyclobutane (HFC-354).

The detectable gas (e.g. $SF_6$), should easily pass through the fine leak openings. Therefore, non-polar gases are preferred. The detectable gas should have a gaseous state under standard conditions and be inert (i.e. non-reactive/non-corrosive) with the material tested, the materials of the test system and the detectable liquid.

The detectable gas should also have physical characteristics which are highly detectable by measurement instrument 104. The detectable gas should be discernable from background levels of gases encountered during the test. Preferably, the gas is discernable in amount and type from atmospheric gases. Because detectable amounts of liquid vapor can also pass through the fine leak openings, the gas and liquid can be chosen so that one measurement instrument can measure the presence of either the detectable gas or the detectable liquid vapor.

The detectable gas should be sufficiently soluble in the detectable liquid such that a detectable concentration of gas passes through the seal through any gross or fine leaks. For example, the gas should generally have a solubility in the liquid of greater than 5 cc of gas per 100 mL of liquid at standard temperature and pressure. Preferably, the gas has a solubility in the liquid of greater than 11 cc of gas per 100 mL of liquid. Most preferably, the gas has a solubility in the liquid of greater than 100 cc of gas per 100 mL of liquid. Examples of gases having a suitable solubility include helium (He), which has a solubility of 11 cc per 100 mL of FLUORINERT ™ FC-84 ™ liquid, and sulfurhexafluoride ($SF_6$), which has a solubility of 863 cc per 100 mL of FLUORINERT ™ FC-84 ™ liquid. It has been found that dissolving the detectable gas in the detectable liquid to saturation at standard conditions provides a detection medium having the best characteristics for detecting gross and fine leaks.

Examples of suitable detectable gases include perfluorinated gases, such as sulfurhexafluoride ($SF_6$), hexafluoroethane ($C_2F_6$) and trifluoromethylsulfurpentafluoride ($CF_3SF_5$); helium; or radioactive tracer gases, such as krypton-85/nitrogen mixtures. However, the perfluorinated gases are preferred for several reasons. Perfluorinated gases are chemically inert. Perfluorinated gases are also highly soluble in perfluorinated liquids which are preferred choices for the detectable liquid. Most importantly, a number of measurement devices can easily discern the presence of perfluorinated gases because perfluorinated compounds are generally present in the ambient atmosphere at low concentrations.

Useful detectable gases include, but are not limited to:

perfluorinated alkanes including, but not limited to, perfluoromethane, perfluoropropane, perfluorocyclopropane, perfluorocyclobutane and perfluorinated alkanes containing one or more pendant sulfurpentafluoride groups (e.g. $CF_3SF_5$ or $C_2F_5-SF_5$);

perfluorinated amines including, but not limited to, perfluorotrimethylamine, perfluorodimethylethylamine, and perfluoroamino ethers;

perfluorinated acyclic ethers including, but not limited to, perfluorodimethylether, and perfluorodiethylether;

perfluorinated cyclic ethers including but not limited to 2,2,3,3,4,4,5,5-octafluorooxacyclopentane;

chlorofluorocarbon gases including, but not limited to, trichlorofluoromethane (Freon-11), and dichlorodifluoromethane (Freon-12);

hydrochlorofluorocarbon gases including, but not limited to, chlorodifluoromethane (HCFC-22), and 2-chloro-1,1,1,2-tetrafluoroethane (HCFC-124); and hydrofluorocarbon gases including, but not limited to, trifluoromethane (HFC-23), 1,1-difluoroethane (HFC-152a), and $CF_3CH_2F$ (HFC-134a).

EXAMPLES 1-3

The following information describes an experimental trial which illustrates a method for combined gross leak and fine leak testing, according to the present invention.

Three ceramic dual-in-line-packages (DIPS) were tested. The devices were previously tested using the krypton test to determine fine leaks and a NID test to determine gross leaks and shown to be a "gross leaker," a "fine leaker" and a "non-leaker," respectively. The three devices were labeled as:

Example 1-Fine Leaker
Example 2-Gross Leaker
Example 3-Non-Leaker

The experimental procedure is described below and the results are described in TABLE-2

Step 1. Place all three devices in pressure/vacuum chamber (bombing chamber) with the pins pointed up ("dead-bug" position) and evacuate the chamber with a vacuum pump. Continue to evacuate devices for one hour. (Subsequent experiments have shown that a 30 minute evacuation is sufficient.)

Step 2. Add approximately 200 mL of detectable liquid (i.e. filtered FLUORINERT ™ FC-84 ™, available commercially from 3M) saturated with detectable gas (i.e., $SF_6$). That volume of detectable liquid was enough to cover devices.

Step 3. Pressurize the bombing chamber with air to 75 psia (0.52 MPa) for one hour. (Subsequent experiments have shown that a 30 minute pressurization is sufficient.)

Step 4. Remove the devices from the liquid and place in room air with the pins pointed down. Allow to dry for five minutes.

Step 5. Place each device in a head space vial and install a septum. Evacuate the head space vial with a syringe to create a vacuum in the vial to promote the detectable gas and/or detectable liquid vapor to exit the device cavity.

Step 6. Sample the head space vial atmosphere with a syringe and analyze with a gas chromatograph.

In order to classify the leak status of the devices evaluated in these Examples and Examples 4–10, the concentration ranges for each of the respective leak status classifications was first empirically determined using devices of known leak status and a procedure similar to that presented above. These ranges were then used to classify leak status of each of the devices. The empirically determined ranges are presented in TABLE-1.

TABLE 1

| Leak Status | FC-84 concentration gmol/L | $SF_6$ concentration ppm (volume) |
|---|---|---|
| Gross Leak | $10^{-3}$ to $10^{-2}$ | 120 or more |
| Fine Leak | $10^{-5}$ to $10^{-4}$ | 10 to 120 |
| Non-Leak | 0 to $10^{-5}$ | 0.2 to 10 |

TABLE 2

| Example | Predetermined Leak Status | Detectable gas concentration ppm (volume) | Detectable liquid vapor concentration |
| --- | --- | --- | --- |
| 1 | Fine | 34.066 | $10^{-3}$ |
| 2 | Gross | 146.641 | $10^{-2}$ |
| 3 | Non-leaker | 3.387 | negligible |

The concentrations of detectable gas and detectable liquid vapor measured in the Sample were consistent with the predetermined leak status of the devices. Thus, the data indicates that gross, fine and non-leaking devices can be identified with the technique of the present invention.

EXAMPLES 4–10

In the following examples, a number of ceramic DIPS were subjected to the test method of the present invention to determine the accuracy and repeatability of the method. The leak status of the devices were previously determined to be gross leakers, fine leakers or non-leakers by the manufacturer using the krypton and NID tests.

Each device was then tested according to the procedure described in Examples 1–3, but without the investigator knowing whether the device leaked.

For each of the devices evaluated in these Examples, the investigator then drew a 10 microliter sample of the atmosphere from the head space vial for each example. The samples were analyzed using a Hewlett-Packard model 5890 gas chromatograph. The chromatograph was equipped with a 4 meter, ⅛ inch (3.175 mm) stainless steel column packed with Durapack ™ 2742 (Carbowax 400/Porasil C) and an electron capture detector (ECD). The chromatograph was maintained at 55° C. during each analysis.

The concentration of the detectable gas and detectable liquid was compared with predetermined concentration ranges of TABLE-1. The determination was checked against the information provided by the manufacturer.

The test was repeated for each example and the results from some of the evaluations are presented in TABLE-3. The repeated tests are denoted by the lower case letter following the numeral. For example, tests 4a, 4b, 4c and 4d represent four separate tests performed on Example 4. Between trials, devices were baked in a vacuum oven at 130° C. for at least 16 hours.

TABLE 3

| Example | Concentration $SF_6$ ppm (vol) | Concentration FC-84 gmol/L | Predetermined Leak Status | Measured Leak Status |
| --- | --- | --- | --- | --- |
| 4a | 62.513 | 1.85E-03 | Gross | Gross |
| 4b | 103.002 | 1.83E-03 | Gross | Gross |
| 4c | 64.262 | 7.90E-04 | Gross | Gross |
| 4d | 41.066 | 3.68E-03 | Gross | Gross |
| 5a | 138.183 | 2.48E-02 | Gross | Gross |
| 5b | 193.881 | 2.59E-02 | Gross | Gross |
| 5d | 119.708 | 2.97E-02 | Gross | Gross |
| 6a | 219.359 | 1.89E-01 | Gross | Gross |
| 6b | 275.920 | 1.97E-01 | Gross | Gross |
| 6d | 158.743 | 1.65E-01 | Gross | Gross |
| 7a | 134.522 | 2.36E-02 | Gross | Gross |
| 7b | 137.908 | 1.04E-02 | Gross | Gross |
| 7d | 158.904 | 1.59E-02 | Gross | Gross |
| 8a | 1.896 | 8.93E-05 | Non-leaker | Non-leaker |
| 8b | .608 | 1.18E-04 | Non-leaker | Non-leaker |
| 8d | 1.081 | 1.25E-04 | Non-leaker | Non-leaker |
| 9a | 24.737 | 4.42E-03 | Fine | Fine |
| 9b | 22.063 | 4.70E-03 | Fine | Fine |
| 9d | 30.314 | 3.70E-03 | Fine | Fine |
| 9e | 6.737 | 1.07E-03 | Fine | Fine |
| 10a | 45.903 | 1.47E-03 | Fine | Fine |
| 10b | 114.004 | 4.39E-03 | Fine | Fine |
| 10d | 97.423 | 7.41E-03 | Fine | Fine |
| 11a | 5.382 | 1.73E-04 | Fine | Non-leaker |
| 11b | 0.199 | 1.11E-04 | Fine | Non-leaker |
| 11c | 0.280 | 4.84E-05 | Fine | Non-leaker |

The results show that this invention is a reliable method of leak detection.

EXAMPLES 12–23

In Examples 12–23, a number of different detectable gas/detectable liquid combinations were tested. Each example employed a ceramic DIP whose leak status had been previously determined in accordance with the procedures set forth in Mil. Spec. 883D, Method 1014.9. The bombing, evacuation and wait times (in minutes) are shown below. The experiments were run similarly to the method described in Examples 1–3, and the results are presented in TABLE-4.

In the Examples 11–22, the following detectable liquids were used:

A. FC-84 ™ = Fluorinert brand Electronic Fluid available from 3M, a mixture of perfluorinated liquids having a boiling point of 80° C.

B. Galden ™ DET = a perfluoropolyether available from Ausimont S.p.A. having a boiling point of 90° C.

C. R113 = $CF_2Cl-CFCl_2$.

TABLE 4

| Ex. | Gas | Liq | Predetermined Leak Status | Times evac/bomb/sampling | Gas concentration ppm (vol) | Liq concentration (gmol/L) |
| --- | --- | --- | --- | --- | --- | --- |
| 12 | $SF_6$ | B | non-leaker | 30/30/30 | 1.47 | 1.07E-04 |
| 13 | $SF_6$ | B | gross | 30/30/180 | 192.51 | 1.15E-03 |
| 14 | $SF_6$ | B | fine | 30/30/30 | 45.04 | 1.17E-04 |
| 15 | $SF_6$ | C | non-leaker | 40/30/90 | .63 | 3.18E-05 |
| 16 | $SF_6$ | C | gross | 40/30/30 | 38.04 | 1.75E-03 |
| 17 | $SF_6$ | C | fine | 40/30/30 | 2.06 | 3.41E-04 |
| 18 | $CF_3-SF_5$ | A | non-leaker | 30/30/90 | .34 | 3.81E-05 |
| 19 | $CF_3-SF_5$ | A | fine | 30/30/30 | 547.96 | 2.27E-03 |
| 20 | $CF_3-SF_5$ | A | non-leaker | 30/30/90 | 6.34 | 1.76E-05 |
| 21 | $CF_3-SF_5$ | A | fine | 30/30/30 | 460.47 | 4.00E-02 |
| 22 | $CF_3-SF_5$ | A | non-leaker | 30/30/90 | 5.68 | 1.57E-05 |
| 23 | $CF_3-SF_5$ | A | fine | 30/30/30 | 332.0 | 1.00E-05 |

The data indicates that the leak status of the devices could be determined using the various detection media evaluated in these Examples because discernable differences in the concentrations of detectable gas and detectable liquid were measured for devices of different leak status.

EXAMPLES 24–25

In Examples 24–25, two ceramic DIP devices were tested with a detection medium comprised of helium dissolved to saturation in FC-84 ™. The leak status of the devices had previously been determined according to Mil. Spec. 883D, Method 1014.9.

The method used to evaluate the devices used in Examples 24 and 25 was similar to that used in Examples 1 to 3 except that He was used as the detectable gas, the bomb time in Step 3 was 16 hours instead of 30 minutes and the device was pressurized with He instead of air, the device was baked in a vacuum oven at 130° C. for about 64 hours, and instead of Steps 5 and 6, the sample was placed in a glass vial adapted for mounting on a portable He leak detector (containing a mass spectrometer, available commercially from Varian Vacuum Products). The portable detector displays He leak rate. The data shows that a measurable difference in He concentration, indicating a difference in leak status can be determined by this method. However, the relative low solubility of He in fluorinated detectable liquid necessitates long bomb times and/or pressurization with He to improve the reliability of the method.

TABLE 5

| Example | Gas | Liquid | Predetermined Leak Status | Detectable gas concentration atm-cc/sec at t = 0 |
|---|---|---|---|---|
| 24 | He | FC-84 | fine | 6.0E-09 |
| 25 | He | FC-84 | non-leaker | below detectable limit of leak detector |

The detection medium and test method provided by the present invention allows simultaneous testing of gross and fine leaks in hermetic seals. The combined test may be used to test hermetic seals in a wide variety of applications, in addition to microelectronic and semiconductor devices. The combined test reduces by roughly one half the time and handling required to test a device (for highly soluble gases), as compared to test procedures of the prior art. This reduces the overall cost and production time for each device.

Although the present invention has been described with reference to preferred embodiments, workers skilled in the art will recognize that changes may be made in form and detail without departing from the spirit and scope of the invention. For example, other various liquid and gas combinations may be used to form a suitable detection medium. The particular steps performed at the bombing station and the detection station may be varied or replaced with additional steps to suit a particular application. Because the detection medium is required to have distinct, detectable physical characteristics, any measurement instrument capable of detecting those characteristics can be used with the present invention.

What is claimed is;

1. A method for detecting gross and fine leak openings in a hermetically sealed package having a cavity and an exterior surface, the method comprising:
providing a detection medium including a detectable gas dissolved in a detectable liquid, wherein the detectable gas has a solubility in the detectable liquid of at least 5 cc of gas per 100 mL of liquid at standard temperature and pressure;
exposing the sealed package to the detection medium under pressure; removing the sealed package from the detection medium; and
detecting whether a component of the detection medium has entered the sealed package as an indication of a leak.

2. The method of claim 1 wherein the step of providing a detection medium comprises providing the detectable gas dissolved in a perfluorinated liquid.

3. The method of claim 2 wherein the step of providing a detection medium comprises providing the detectable gas dissolved in perfluoroheptane.

4. The method of claim 1 wherein the step of providing a detection medium comprises providing the detectable gas dissolved in a detectable liquid selected from the group consisting of perfluorinated alkanes, perfluorinated amines, perfluoroaminoethers, perfluorinated ethers, chlorofluorocarbon liquids, hydrochlorofluorocarbon liquids and hydrofluorocarbon liquids.

5. The method of claim 1 wherein the step of providing a detection medium comprises providing a detectable liquid having a boiling point between about 30° C. and about 180° C.

6. The method of claim 1 wherein the step of providing a detection medium comprises providing a detectable liquid having a surface tension of less than about 75 dynes/cm.

7. The method of claim 1 wherein the step of providing a detection medium comprises providing a gas selected from the group consisting of perfluorinated alkanes, perfluorinated amines, perfluorinated cyclic compounds, perfluorinated acyclic ethers, perfluorinated cyclic ethers, chlorofluorocarbon gases, hydrochlorofluorocarbon gases and hydrofluorocarbon gases, which is dissolved in the detectable liquid.

8. The method of claim 1 wherein the step of providing a detection medium comprises providing a perfluorinated gas dissolved in the detectable liquid.

9. The method of claim 8 wherein the step of providing a detection medium comprises providing a perfluorinated gas selected from the group consisting of sulfurhexafluoride, hexafluoroethane, perfluoromethane and trifluoromethylsulfurpentafluoride, which is dissolved in the detectable liquid.

10. The method of claim 1 wherein the step of exposing the sealed package to the detection medium comprises:
providing a bombing chamber; placing the sealed package in the bombing chamber; and
introducing the detection medium into the bombing chamber to a level sufficient to submerge the sealed package.

11. The method of claim 10 and further comprising:
evacuating the bombing chamber to a selected pressure for a selected time period before performing the step of introducing the detection medium, wherein the pressure and time period are selected to evacuate the cavity if a gross leak exists.

12. The method of claim 11 wherein the step of evacuating comprises evacuating the bombing chamber to approximately 5 torr, for about 30 minutes.

13. The method of claim 10 wherein the step of exposing the sealed package to the detection medium comprises exposing under pressure.

14. The method of claim 13 and further comprising:
pressurizing the bombing chamber, after introducing the detection medium, to a pressure that is sufficient to cause the gas to separate from the liquid and enter the cavity through a fine leak; and
maintaining the pressure for a time period sufficient to allow detectable amounts of detectable gas or detectable liquid to enter the cavity through fine and gross leaks, respectively.

15. The method of claim 1 wherein the step of removing the sealed package comprises:
air drying the sealed package to evaporate detection medium present on the exterior surface of the sealed package.

16. The method of claim 1 wherein the step of detecting comprises detecting whether an amount of detectable liquid vapor above a threshold level exits the sealed package as an indication of a gross leak.

17. The method of claim 1 wherein the step of detecting comprises detecting whether an amount of the detectable gas or detectable liquid vapor above a threshold level exits the sealed package as an indication of either a gross or fine leak.

18. The method of claim 1 further comprising the steps of:
placing the sealed package in a test chamber after removing the package from the detection medium; and
collecting components of the detection medium in the test chamber which have escaped from the cavity.

19. The method of claim 18 further comprising the step of partially evacuating the test chamber to accelerate the escape of detection medium components which have entered the cavity.

20. The method of claim 18 further comprising the step of detecting whether a component of the detection medium has escaped the cavity by separating components of the detection medium collected in the test chamber with a gas chromatograph and measuring the relative amounts of said components.

21. A method for detecting gross and fine leak openings in a hermetically sealed device, the method comprising:
providing a detection medium including a detectable gas dissolved in a detectable liquid, wherein the detectable gas has a solubility in the detectable liquid of at least 5 cc of gas per 100 mL of liquid at standard temperature and pressure;
exposing the sealed device to the detection medium;
providing a pressure differential across the hermetic seal to cause the detectable gas or detectable liquid vapor to separate from the detection medium and enter the sealed device through any fine leak openings and to cause the detectable liquid and detectable gas to enter the sealed device through any gross leak openings;
removing the sealed device from the detection medium; and
detecting whether a component of the detection medium has entered the sealed device as an indication of a leak.

22. A system configured for detecting gross and fine leaks in a hermetically sealed package, the system comprising:
a detection medium comprising a detectable gas dissolved in a perfluorinated liquid, Wherein the. detectable gas has a solubility in the detectable liquid of at least 5 cc of gas per 100 mL of liquid at standard temperature and pressure;
bombing chamber means for holding the sealed package;
means in fluid communication with the bombing chamber means for evacuating the bombing chamber means;
means in fluid communication with the bombing chamber means for introducing the detection medium into the bombing chamber means;
means in fluid communication with the bombing chamber means for pressurizing the bombing chamber means, and
means for detecting whether a component of the detection medium escapes the sealed package as an indication of a leak, said means for detecting being operatively connected to said bombing chamber means.

* * * * *

UNITED STATES PATENT AND TRADEMARK OFFICE
CERTIFICATE OF CORRECTION

PATENT NO. : 5,369,983
DATED : December 6, 1994
INVENTOR(S) : Mark W. Grenfell

It is certified that error appears in the above-indentified patent and that said Letters Patent is hereby corrected as shown below:

Column 18:
Claim 22, Line 20, "Wherein the."
  should be --wherein the--

Claim 22, Line 34, "means,"
  should be --means;--

Signed and Sealed this

Eighteenth Day of April, 1995

Attest:

BRUCE LEHMAN

*Commissioner of Patents and Trademarks*

*Attesting Officer*